(12) United States Patent
Azuma

(10) Patent No.: US 10,031,341 B2
(45) Date of Patent: Jul. 24, 2018

(54) HEAD-UP DISPLAY DEVICE

(71) Applicant: NIPPON SEIKI CO., LTD., Niigata (JP)

(72) Inventor: Masatoshi Azuma, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/320,374

(22) PCT Filed: Jun. 10, 2015

(86) PCT No.: PCT/JP2015/066705
§ 371 (c)(1),
(2) Date: Dec. 20, 2016

(87) PCT Pub. No.: WO2015/198862
PCT Pub. Date: Dec. 30, 2015

(65) Prior Publication Data
US 2017/0160551 A1 Jun. 8, 2017

(30) Foreign Application Priority Data
Jun. 26, 2014 (JP) ................. 2014-131129

(51) Int. Cl.
G02B 27/01 (2006.01)
B60K 35/00 (2006.01)
(Continued)

(52) U.S. Cl.
CPC .......... *G02B 27/0176* (2013.01); *B60K 35/00* (2013.01); *H04N 5/7491* (2013.01); *H05B 3/84* (2013.01); *G09G 2320/041* (2013.01)

(58) Field of Classification Search
None
See application file for complete search history.

(56) References Cited

U.S. PATENT DOCUMENTS

2014/0022645 A1* 1/2014 Matsuura .......... G02B 27/0101
359/626

FOREIGN PATENT DOCUMENTS

JP 5-23404 U 3/1993
JP 2010-015037 A 1/2010
(Continued)

OTHER PUBLICATIONS

International Search Report and Written Opinion dated Aug. 25, 2015, issued in International Application No. PCT/JP2015/066705. (w/ partial English translation).

*Primary Examiner* — Kenneth B Lee, Jr.
(74) *Attorney, Agent, or Firm* — McDermott Will & Emery LLP

(57) ABSTRACT

A head-up display device includes: a cover having a light-transmissive light exit part; a first case mating with the cover and having a light entry part for entry of display light and a housing part housing a reflecting member; a light source unit outside the housing part; and a second case covering the light source unit and fastened to the first case. The device has a heat radiator of higher rigidity than the second case, having a wall part that externally projects from the housing part through the intervening light entry part, the light source unit affixed to the wall part to diffuse the heat from the light source unit; and includes a mating part in which the second case and the wall part mate together, the second case fastened to the heat radiator at locations to either side of the mating part.

5 Claims, 3 Drawing Sheets

(51) Int. Cl.
*H04N 5/74* (2006.01)
*H05B 3/84* (2006.01)

(56) References Cited

FOREIGN PATENT DOCUMENTS

| | | |
|---|---|---|
| JP | 2013-174855 A | 9/2013 |
| JP | 2014-085657 A | 5/2014 |

\* cited by examiner

[FIG 1]
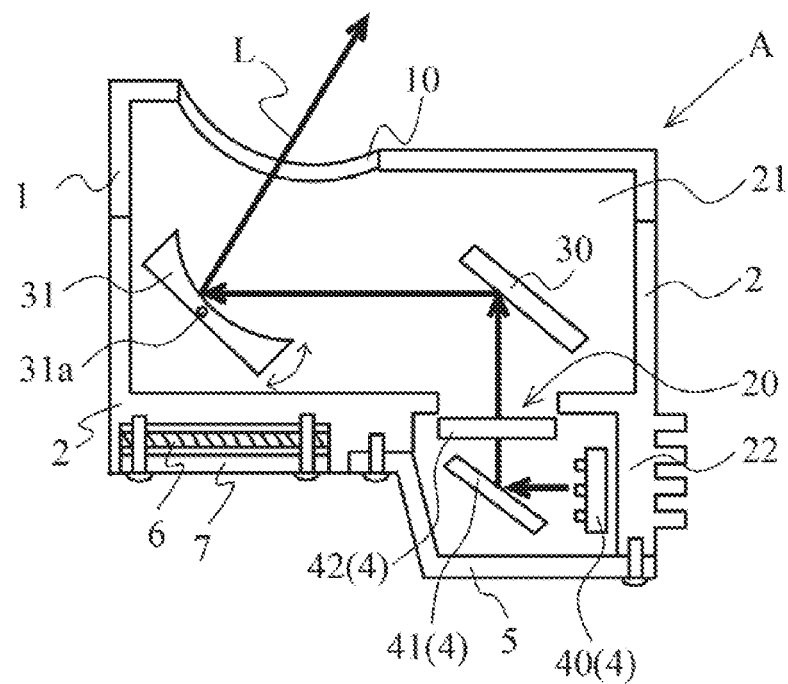
[FIG 2]
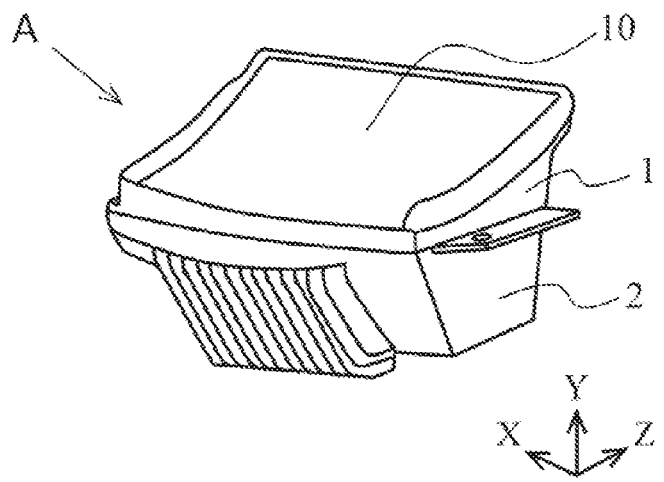

[FIG 3]
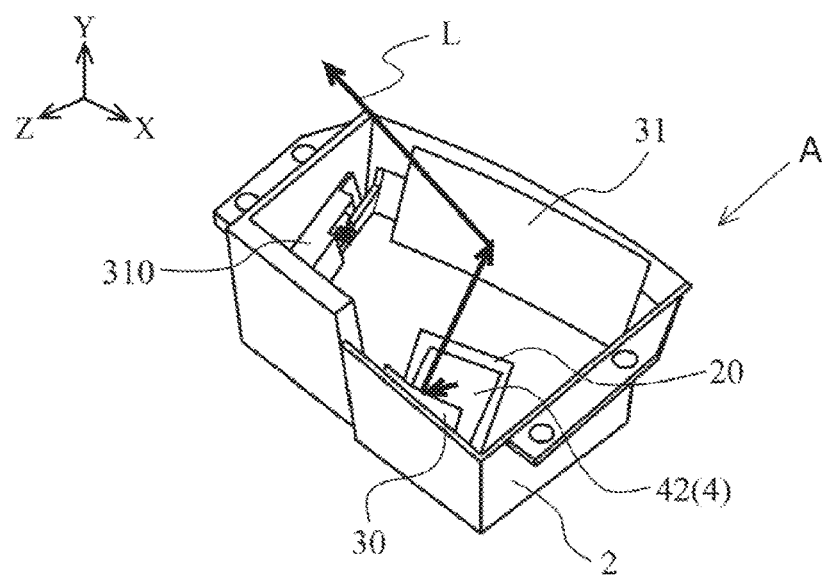
[FIG 4]
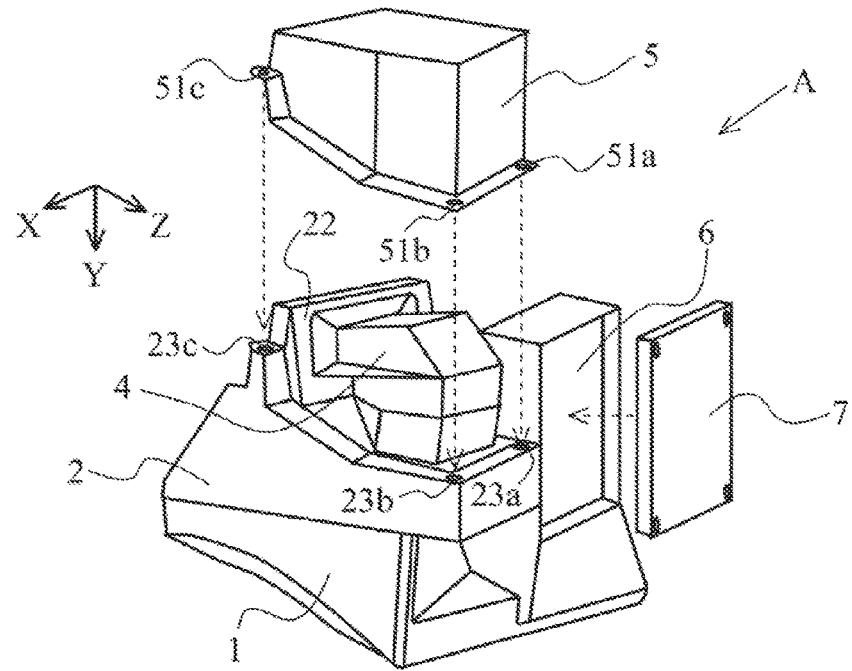

[FIG 5]
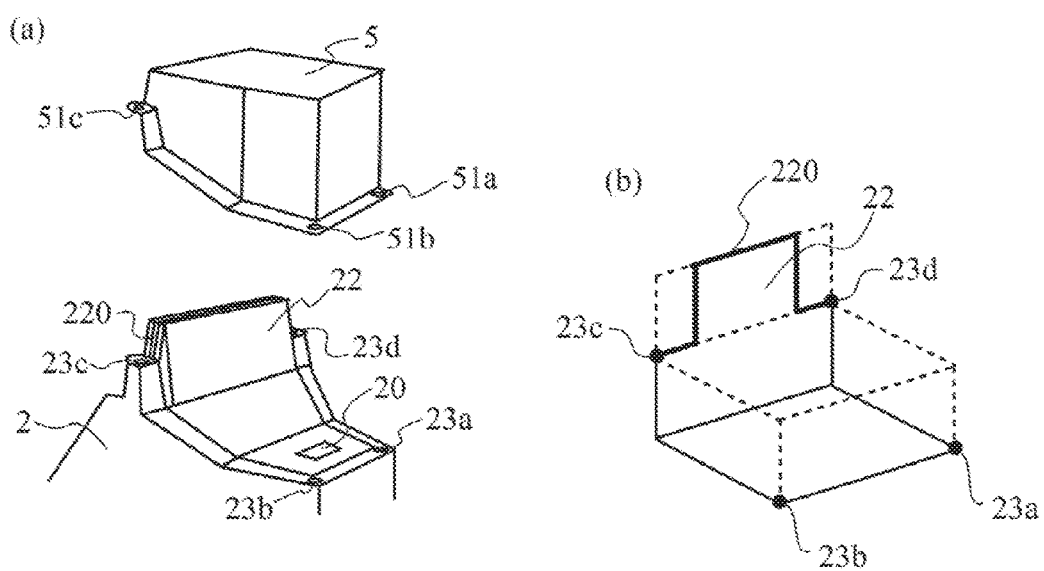

HEAD-UP DISPLAY DEVICE

CROSS-REFERENCE TO RELATED APPLICATION

This application is the U.S. National Phase under 35 US.C. § 371 of International application No. PCT/JP2015/066705, filed on Jun. 10, 2015, which claims the benefit of Japanese Application No. 2014-131129, filed on Jun. 26, 2014, the entire contents of each are hereby incorporated by reference.

TECHNICAL FIELD

The present invention relates to a head-up display device having a favorable assembling property.

BACKGROUND ART

Conventionally, PTL 1 discloses a configuration in which, in a head-up display device for displaying a virtual image in front of a windshield of a vehicle, a light source unit having a back surface to which a heat radiator is attached is provided on the outside of a case that houses a reflecting member for reflecting display light from the light source unit toward the windshield in order to efficiently radiate heat emitted by the light source unit.

CITATION LIST

Patent Literature(s)

PTL 1: JP-UM-A-5-23404

SUMMARY OF INVENTION

Technical Problem(s)

In the head-up display device disclosed in PTL 1, there is a possibility that an assembling property is further improved in fixing a second case that covers the light source unit fixed to the outside of a first case that houses the reflecting member.

The invention has been made in view of the above problem, and an object thereof is to provide a head-up display device having a favorable assembling property.

Solution to Problem(s)

A head-up display device according to the invention including
 a cover having a light-transmissive light exit part,
 a first case having a light entry part on which light is incident and a housing part housing a reflecting member for reflecting light incident through the light entry part toward the light exit part, the first case being mated to the cover,
 a light source unit fixed to the outside of the housing part of the first case so that light is incident on the light entry part, and
 a second case covering the light source unit and fixed to the first case with screws,
 the head-up display device being for performing display on the outside by causing the reflecting member to reflect light emitted by the light source unit and transmitting the light through the light exit part of the cover,
 the head-up display device includes:
 a heat radiator having a higher rigidity than a rigidity of the second case and having a wall part protruded in a direction from the inside of the housing part to the outside of the housing part via the light entry part, the wall part being a part to which the light source unit is fixed with screws so that the heat radiator radiates heat of the light source unit, wherein:
 the second case and the wall part have mating parts with which the second case and the wall part are mated to each other; and
 the second case is fixed to the heat radiator or the first case with screws at positions between which the mating parts are interposed.

Advantageous Effects of Invention

According to the invention, it is possible to provide a head-up display device having a favorable assembling property.

BRIEF DESCRIPTION OF DRAWINGS

FIG. 1 is a schematic configuration diagram of a head-up display device according to an embodiment of the invention.

FIG. 2 is a perspective view of a surface of the head-up display device according to the same embodiment.

FIG. 3 is a perspective view of the surface in a state in which a cover of the head-up display device according to the same embodiment is removed.

FIG. 4 is a perspective view of a back surface of the head-up display device according to the same embodiment.

FIG. 5 shows an assembling relationship between a first case and a second case of the head-up display device according to the same embodiment.

DESCRIPTION OF EMBODIMENTS

Hereinafter, an embodiment of the invention will be described with reference to the attached drawings.

A head-up display device A according to the invention includes a cover 1, a first case 2, a reflecting member 3, a light source unit 4, a second case 5, a control board 6, and a third case 7 and causes the reflecting member 3 to reflect display light L projected by the light source unit 4 to project and display the display light L on the outside of the cover 1.

This head-up display device A is mounted on a vehicle and projects display light L onto a windshield on a driver's seat side of the vehicle to form a virtual image in front of the windshield. For example, by projecting an instrument image including a driving speed and the like of the vehicle as display light L onto the windshield, a driver can check vehicle information superimposed on a scenery outside the vehicle through the windshield at the time of driving while keeping his/her eyes forward.

The cover 1 is a cover made of, for example, resin such as polyethylene terephthalate (PET) or polycarbonate (PC). The cover 1 has, for example, a light exit part 10 made of light-transmissive resin such as acrylic resin and transmits display light L reflected by the reflecting member 3, thereby projecting the display light L onto the windshield.

The first case 2 is made up of, for example, a case member obtained by performing metal mold casting on aluminum. In the first case 2, a light entry part 20 for introducing display light L projected by the light source unit 4 is provided in a housing part 21 housing the reflecting member 3, and the first case 2 is mated to the cover 1. The light introduced through the light entry part 20 is reflected by the reflecting member 3 housed in the housing part 21, is transmitted through the light exit part 10 of the cover 1, and is projected onto the windshield.

A wall part 22 protruded in a direction from the inside of the housing part 21 to the outside of the housing part 21 via the light entry part 20 is provided on the outside of the housing part 21 of the first case 2.

A backlight board 40 (described below) of the light source unit 4 is fixed to the wall part 22 with screws. Heat emitted by the backlight board 40 is transmitted to the whole first case 2 via the wall part 22 and the heat is radiated to an external environment via the first case 2, and thus the whole first case 2 functions as a heat radiator of the light source unit 4.

Note that a heat conductive sheet for bringing the wall part 22 and the light source unit 4 into close contact with each other to reduce a contact thermal resistance may be provided between the wall part 22 and the light source unit 4.

The reflecting member 3 is made up of a first reflecting member 30 and a second reflecting member 31. The first reflecting member is made up of a plane mirror, and the second reflecting member 31 is made up of a concave mirror unit that is rotatable around a rotating shaft 31a by power of a drive unit 310.

The light source unit 4 includes the backlight board 40, a reflecting member 41, and a liquid crystal substrate 42.

The backlight board 40 is made up of a circuit board on which an LED (Light Emitting Diode) serving as a light source is mounted and projects display light L at a brightness based on control by the control board 6. Further, the backlight board 40 is fixed to the wall part 22 with screws so that a surface on which the LED is mounted faces the reflecting member 41 and a surface (back surface) on which the LED is not mounted faces the wall part 22.

The reflecting member 41 is made up of a plane mirror and reflects the display light L emitted by the backlight board 40 toward a back surface of the liquid crystal substrate 42.

The liquid crystal substrate 42 is made up of, for example, a TFT (Thin Film Transistor) type liquid crystal panel and is placed so that a surface thereof faces the light entry part 20 of the first case 2. Further, the liquid crystal substrate switches a plurality of pixels to a transmissive/non-transmissive state in accordance with control by the control board 6 and causes the pixels in the transmissive state to transmit the light from the backlight board 40, thereby projecting a predetermined image as the display light L onto the light entry part 20 of the first case 2.

The second case 5 is made of, for example, opaque resin that can be easily molded, such as polypropylene (PP) that is comparatively inexpensive and has light weight, and covers the light source unit 4 and is fixed to the first case 2 with screws.

The control board 6 is a circuit board on which various electronic elements and wiring for controlling drive of the drive unit 310 of the second reflecting member 31, the backlight board 40 of the light source unit 4, and the liquid crystal substrate 42 are mounted.

The control board 6 is connected to a CAN (Controller Area Network) and forms vehicle information such as a driving speed of the vehicle acquired via the CAN as an instrument image to thereby project the instrument image as display light L onto the light source unit 4. Further, the control board 6 can adjust a position of a virtual image to a height of an eyepoint of a driver by driving the drive unit 310 and rotating the second reflecting member 31 around the rotating shaft 31a to adjust an imaging position of the virtual image in a vertical direction of the windshield.

The third case 7 is made up of, for example, a flat box-shaped case member made of aluminum and is fixed to the first case 2 with screws to cover the control board 6 so as to prevent the control board 6 from being influenced by an electromagnetic wave from the outside or prevent an electromagnetic wave emitted by the control board 6 from influencing the outside, thereby blocking an influence of an electromagnetic wave between the control board and the external environment.

(Assembling Relationship Between First Case 2 and Second Case 5)

Screwing of the first case 2 and the second case 5 will be described with reference to FIG. 5. FIG. 5(a) is a perspective view obliquely seen from a back surface of the head-up display device A and shows screwing of the first case 2 and the second case 5 in a state in which the light source unit 4 is removed from the first case 2. FIG. 5(b) shows a relationship between the wall part 22 of the first case 2 and screw holes 23a, 23b, 23c, and 23d described below.

Screw holes 51a, 51b, 51c, and 51d are provided at four corners of the second case 5, and the screw holes 23a, 23b, 23c, and 23d are provided in the first case 2 corresponding to the screw holes 51a, 51b, 51c, and 51d. The second case 5 is fixed to the first case 2 with screws through the corresponding screw holes.

The screw hole 23c and the screw hole 23d of the first case 2 are positioned so that the wall part 22 is interposed therebetween, and a grooved mating part 220 is provided in a portion interposed between the screw holes 23c and the screw hole 23d of the wall part 22. Meanwhile, a protruded part to be mated to the grooved mating part 220 is provided in the second case 5. With this, when the second case 5 is fixed to the first case 2 with screws, a side between the screw hole 51c and the screw hole 51d of the second case 5 is mated to the mating part 220 of the wall part 22.

The wall part 22 is protruded from a line segment between the screw hole 23c and the screw hole 23d in a height direction in order to increase a mating area of the mating part 220 to be mated to the second case 5.

The screw hole 23c and the screw hole 23d of the first case 2 are provided at low positions in the height direction of the wall part 22, as compared with the screw hole 23a and the screw hole 23b.

With this configuration, an assembling property of the second case 5 and the first case 2 is improved.

Specifically, the side of the second case 5 made of resin to be mated to the wall part 22 is not deformed in a thickness direction of the wall part 22 because rigidity thereof is secured by the wall part 22 made of aluminum. This reduces the risk that positions of the screw hole 51c and the screw hole 51d are shifted from positions corresponding to the screw holes of the first case 2 even in the case where the second case 5 is deformed by a screw fastening torque. Therefore, when assembling is performed by first screwing the screw hole 51a and the screw hole 51b that are not positioned, the risk of failure of assembly is reduced.

Further, because the wall part 22 is protruded from the line segment between the screw hole 23c and the screw hole 23d in the height direction, the fitting area of the mating part 220 to be mated to the second case 5 is increased, and therefore the side between the screw hole 51c and the screw hole 51d of the second case 5 is provided along the wall part 22 more firmly and is prevented from being deformed in the thickness direction of the wall part 22.

The screw hole 23c and the screw hole 23d of the first case 2 are provided at high positions in the height direction of the wall part 22, as compared with the screw hole 23a and the screw hole 23b. Therefore, when the screw hole 51a and the screw hole 51b that are not positioned are screwed first, a deforming direction caused by a screw fastening torque is matched with the thickness direction of the wall part 22, which reduces the risk that the positions of the screw hole 51c and the screw hole 51d are shifted from the positions corresponding to the screw holes of the first case 2 due to deformation caused by the screw fastening torque.

With those effects, it is possible to position the second case 5 while the rigidity in the side between the screw hole 51c and the screw hole 51d of the second case 5 mated to the wall part 22 is being secured by the wall part 22, and therefore the assembling property is not lost even in the case where the second case is made of a resin material having a comparatively low rigidity or molding precision thereof is comparatively low. Therefore, it is possible to produce the second case inexpensively while securing the assembling property.

Note that, in this embodiment, the first case 2 and the wall part 22 are integrally formed by metal mold casting with aluminum so that the first case 2 has both a function of housing the reflecting member 3 and a function as a heat radiator in order to improve a heat radiation property. However, the first case 2 is not limited thereto, and the first case 2 may be made of resin and a metallic heat radiator having the wall part 22 may be separately formed, and the first case 2 and the metallic heat radiator may be combined with each other.

In the above description, in order to easily understand the invention, description of publicly-known unimportant technical matters has been omitted as appropriate.

INDUSTRIAL APPLICABILITY

The invention is suitable as a head-up display device mounted on a vehicle, a motorcycle, or a move provided with an agricultural machine or a construction machine.

REFERENCE SIGNS LIST

A: head-up display device
1: cover
10: light exit part
2: first case
20: light entry part
21: housing part
22: wall part
220: mating part
3: reflecting member
30: first reflecting member
31: second reflecting member
31a: rotating shaft
310: drive unit
4: light source unit
40: backlight board
41: reflecting member
42: liquid crystal substrate
5: second case
6: control board
7: third case
L: display light

The invention claimed is:

1. A head-up display device, comprising:
a cover including a light-transmissive light exit part;
a first case; and
a second case comprising:
a base including a light entry part, a first surface, and a second surface, wherein the first surface is disposed opposite the second surface on the base;
a first wall extending from the first surface of the base, wherein the first wall mates with the cover to house a reflecting member for reflecting light incident through the light entry part of the second case toward the light-transmissive light exit part of the cover; and
a second wall extending from the second surface of the base, wherein
the first case is fixed to the second wall to house a light source for providing the light incident through the light entry part toward the light-transmissive light exit part via the reflecting member,
the light source includes a liquid crystal panel and a backlight board,
the second wall includes a third surface and a fourth surface,
the third surface is disposed opposite the fourth surface on the second wall,
the backlight board of the light source is fixed to the third surface of the second wall,
a heat radiator is fixed to the fourth surface of the second wall to allow heat generated from the light source to radiate,
the second wall includes further a first opening, a second opening, and a groove extending from the first opening to the second opening, and
the groove of the second wall engages with a protruded part of the first case when the first case is fixed to the second wall.

2. The head-up display device according to claim 1, wherein
the base of the second case includes a third opening on the second surface of the base, and
the first opening, the second opening, and the third opening are configured to receive respective mating members for fixing the first case onto the second wall.

3. The head-up display device according to claim 2, wherein
a first distance from the first opening and the second opening to the second surface of the base differs from a second distance from the third opening to the second surface of the base.

4. The head-up display device according to claim 1, wherein
the second wall of the second case has a higher rigidity than a rigidity of the first case.

5. The head-up display device according to claim 1, wherein
the second case is formed with a same material as the second wall, and
the entirety of the second case radiates the heat generated from the light source.

* * * * *